Sept. 7, 1965
D. E. HOLT ETAL
3,204,780
OVERHANGING TROLLEY FOR CRANES
Original Filed July 11, 1963
8 Sheets-Sheet 1
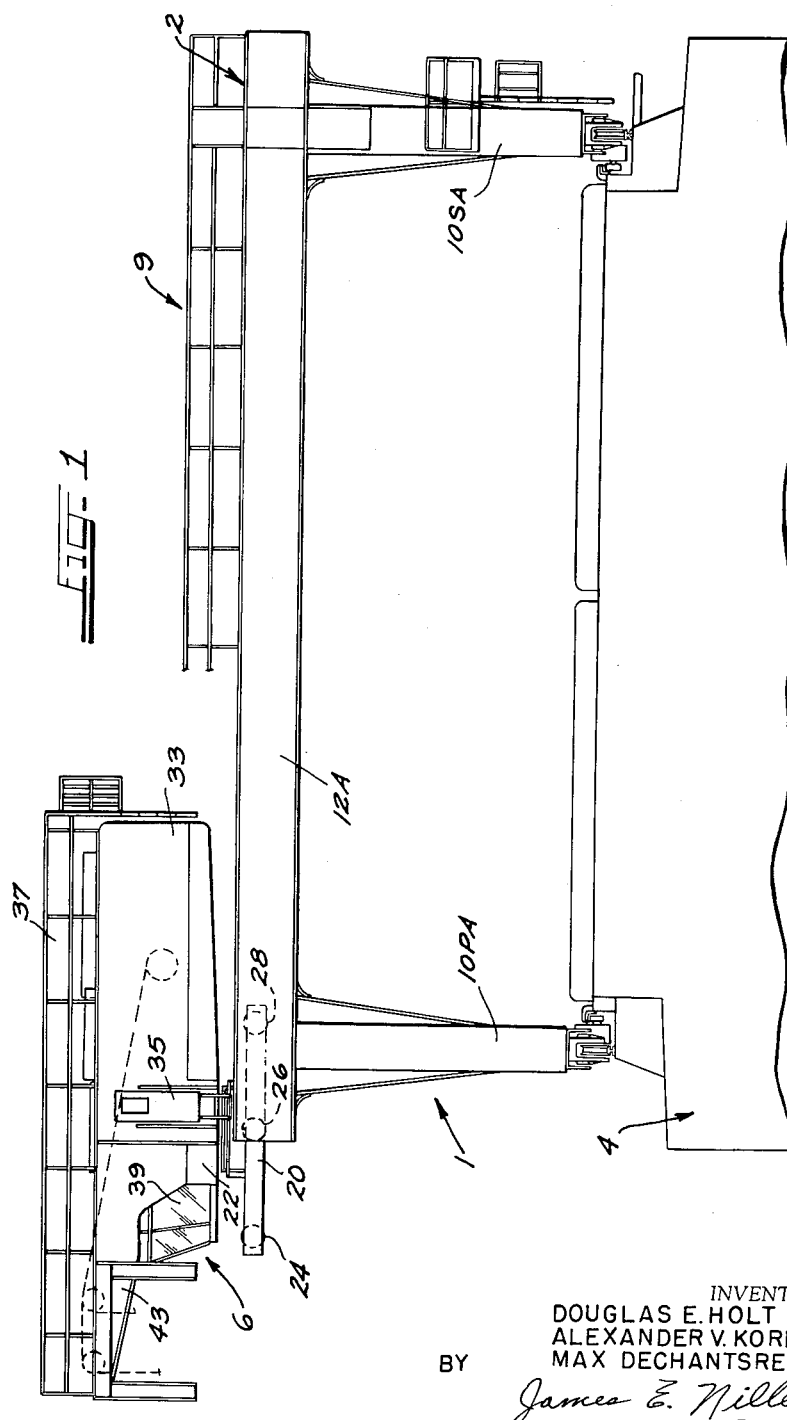
INVENTORS
DOUGLAS E. HOLT
ALEXANDER V. KORE
MAX DECHANTSREITER
BY Sept. 7, 1965  D. E. HOLT ETAL  3,204,780
OVERHANGING TROLLEY FOR CRANES
Original Filed July 11, 1963  8 Sheets-Sheet 2
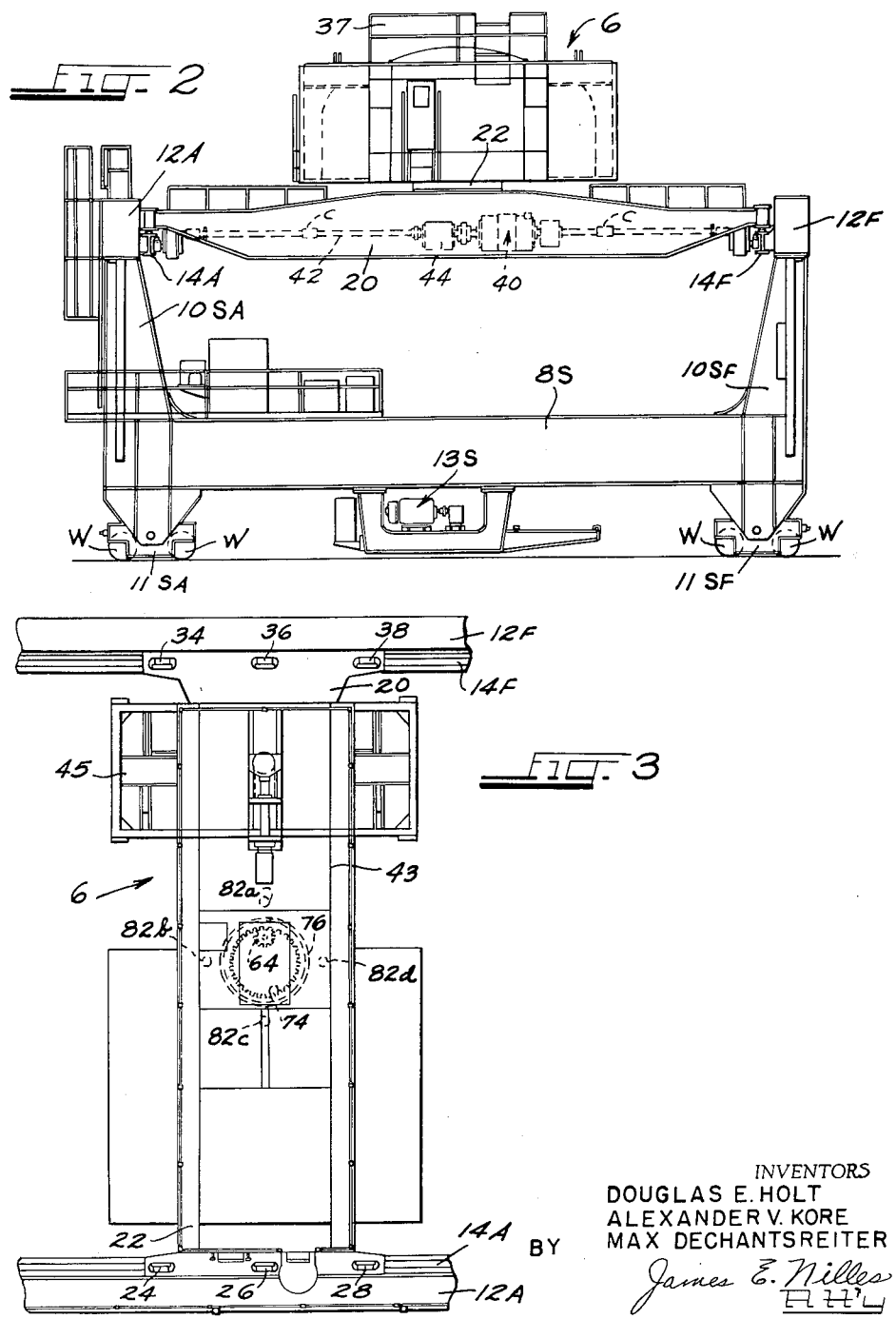
INVENTORS
DOUGLAS E. HOLT
ALEXANDER V. KORE
MAX DECHANTSREITER
BY
James E. Nilles

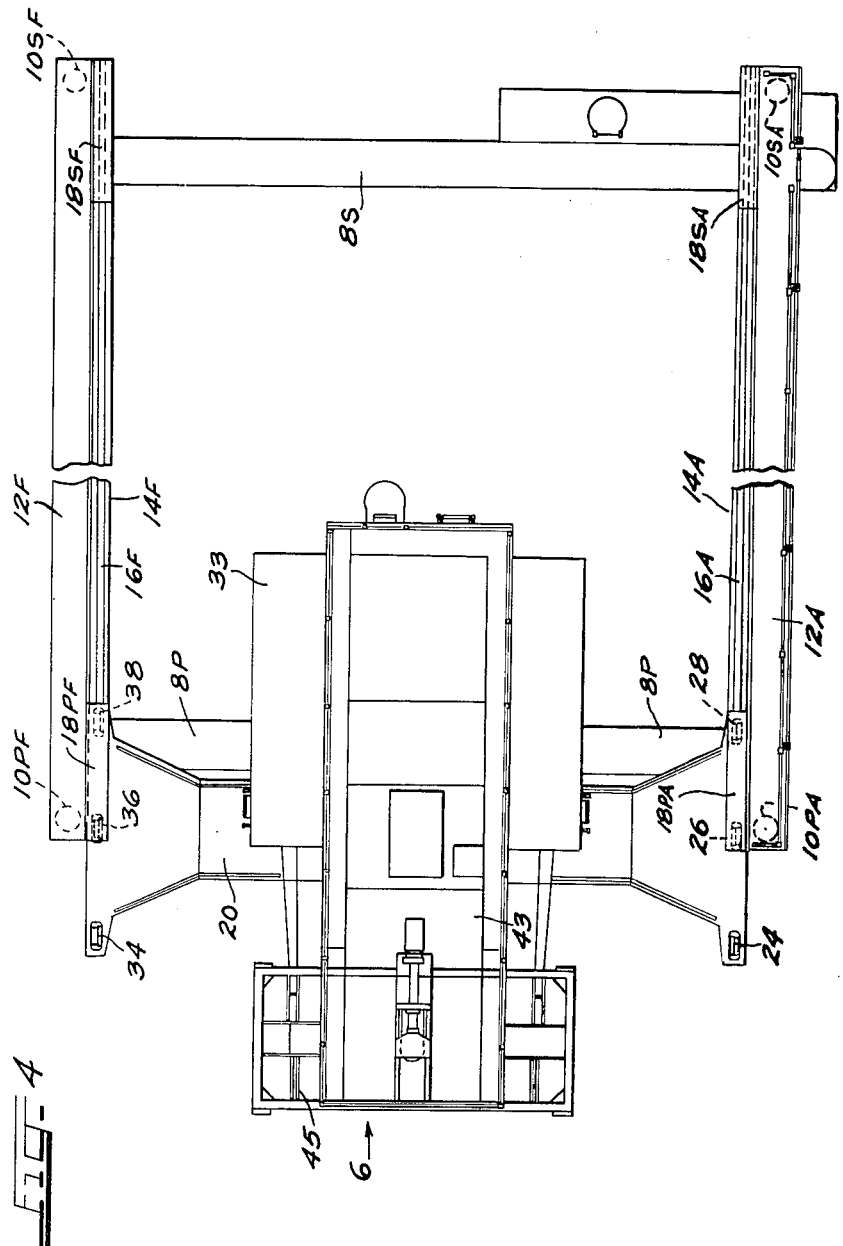

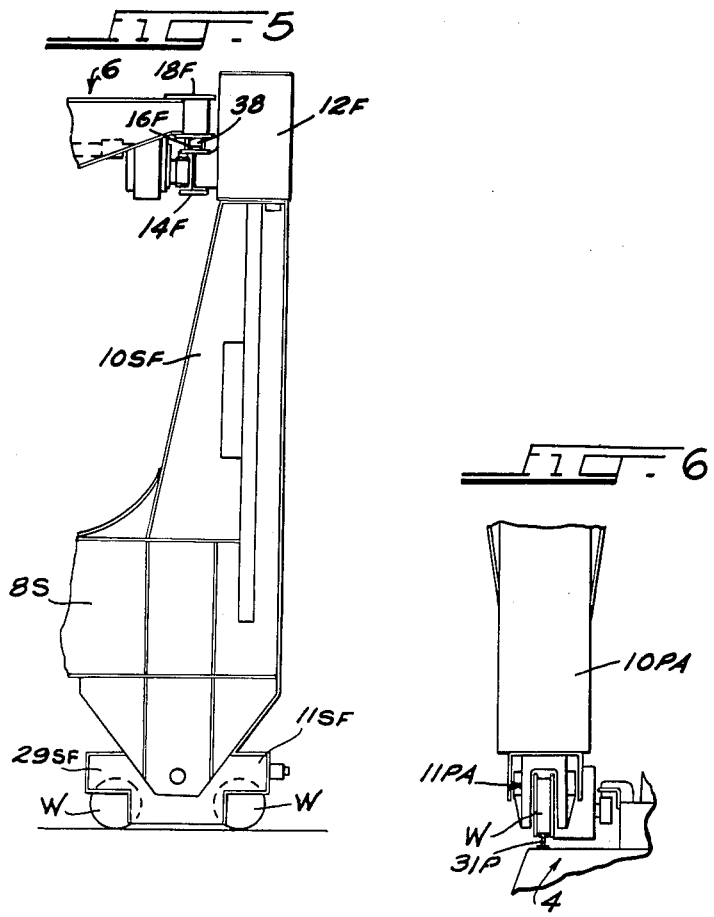

Sept. 7, 1965   D. E. HOLT ETAL   3,204,780
OVERHANGING TROLLEY FOR CRANES
Original Filed July 11, 1963   8 Sheets-Sheet 5
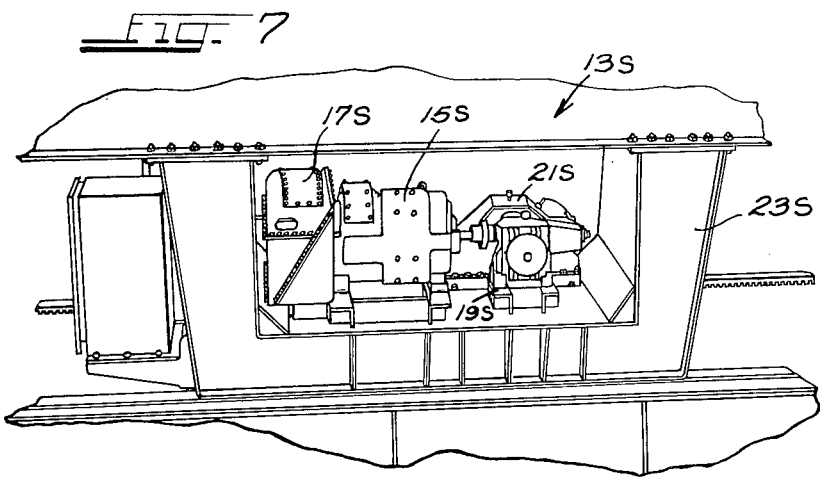
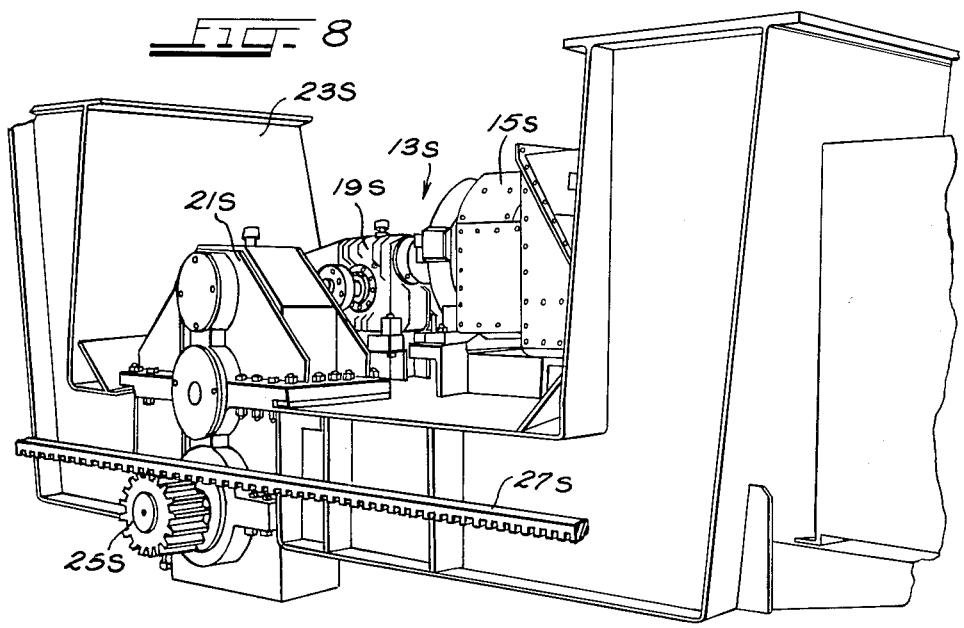
INVENTORS
DOUGLAS E. HOLT
ALEXANDER V. KORE
MAX DECHANTSREITER
BY

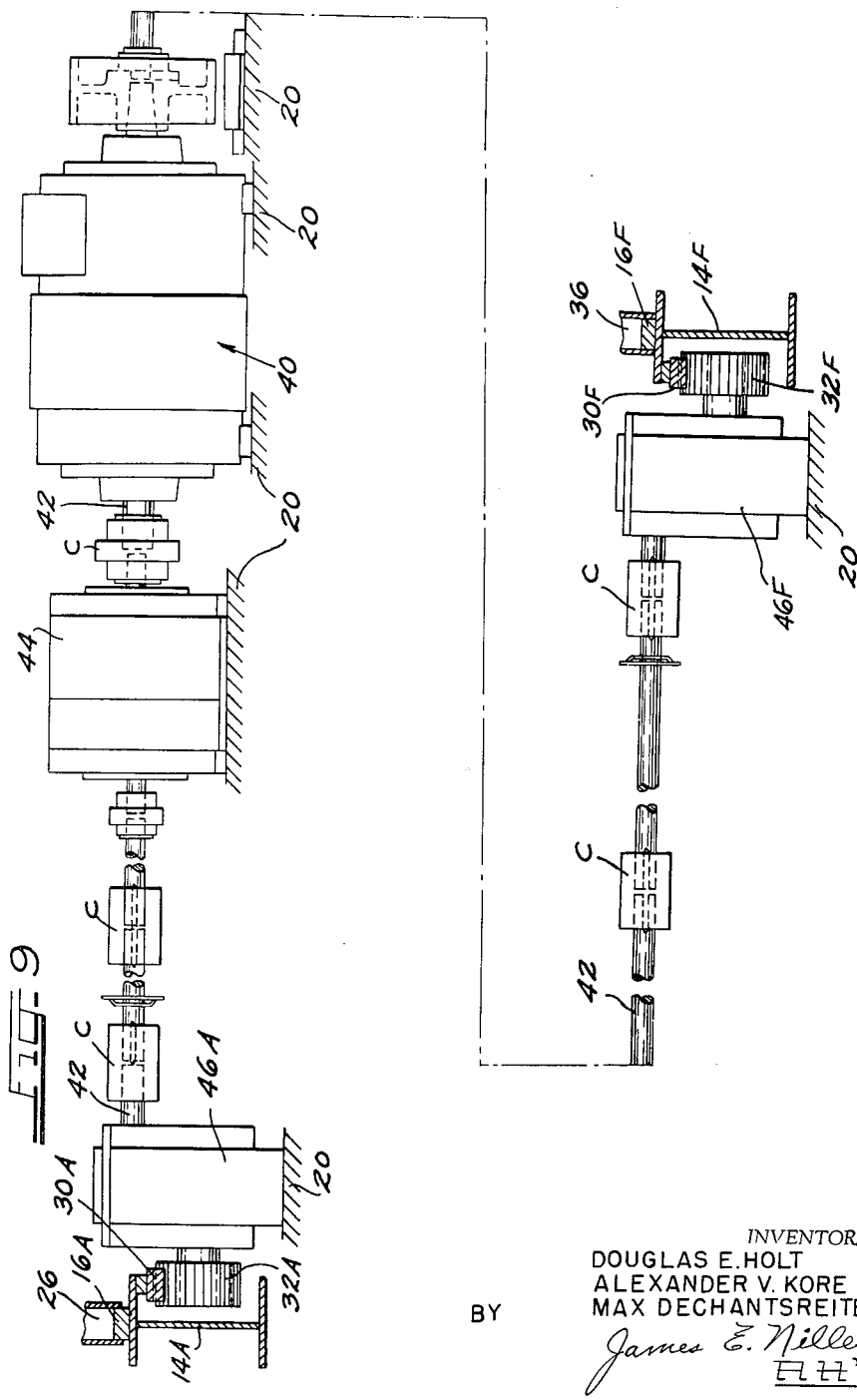

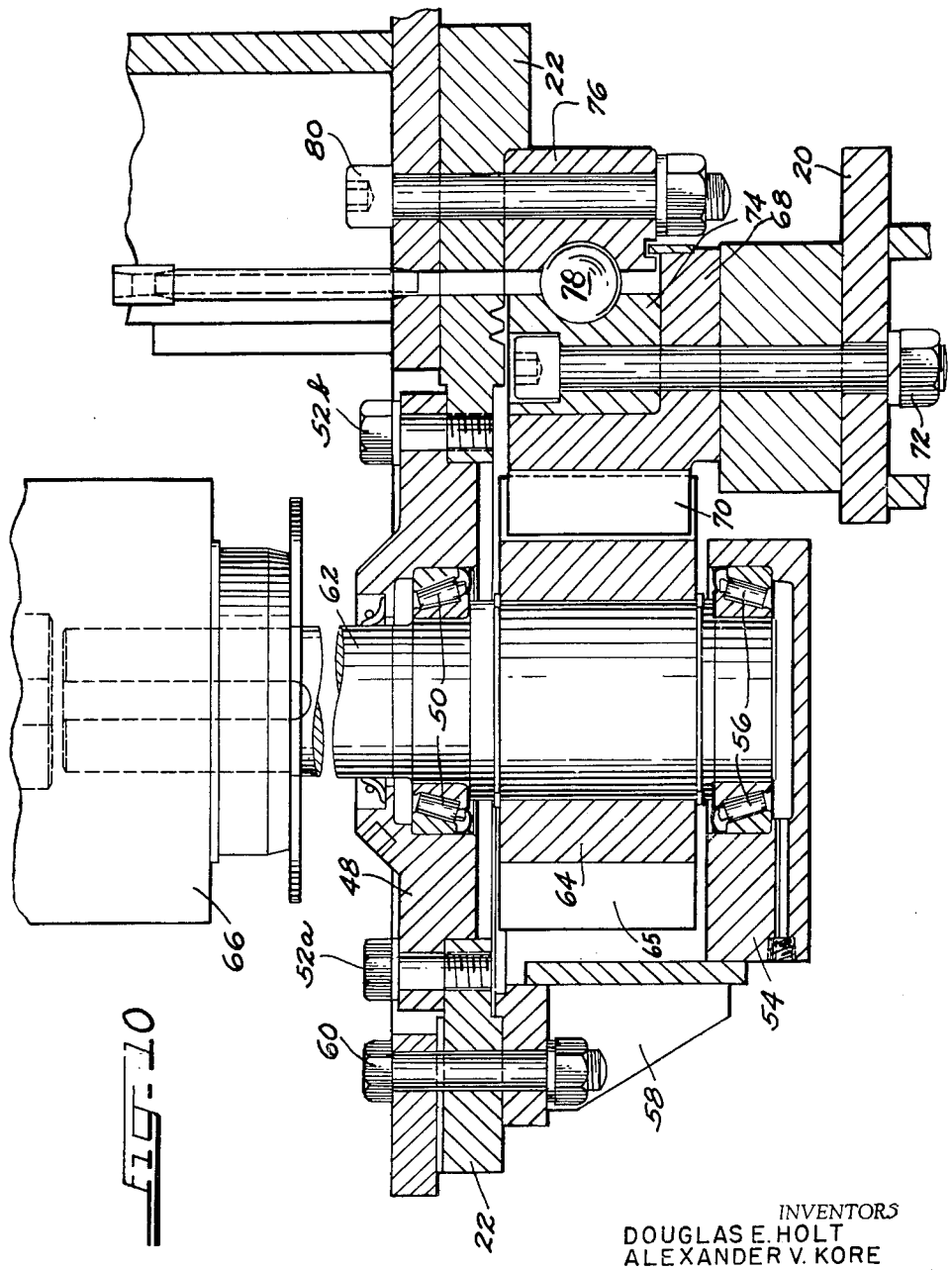

Sept. 7, 1965  D. E. HOLT ETAL  3,204,780
OVERHANGING TROLLEY FOR CRANES
Original Filed July 11, 1963  8 Sheets-Sheet 8
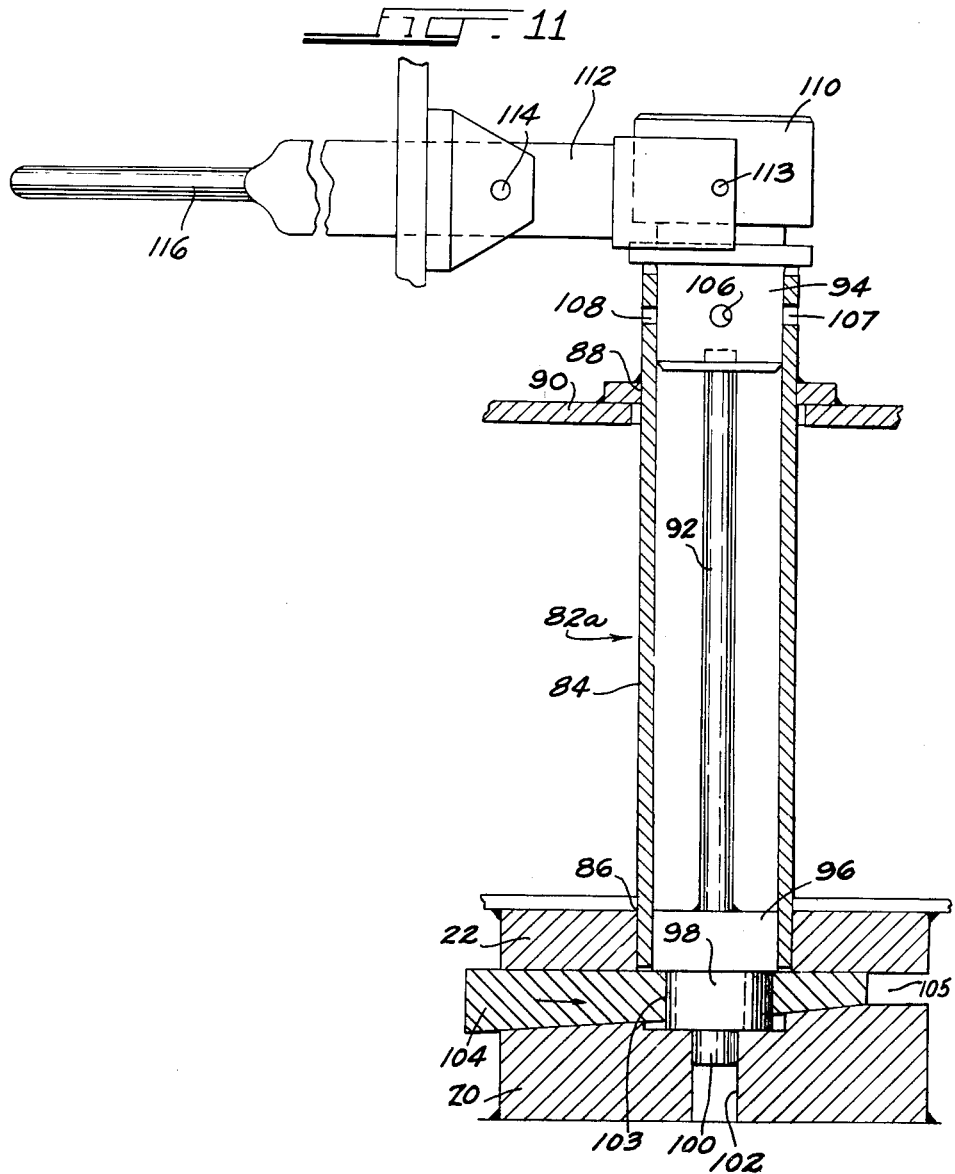
INVENTORS
DOUGLAS E. HOLT
ALEXANDER V. KORE
MAX DECHANTSREITER
BY
James E. Nilles

# United States Patent Office
3,204,780
Patented Sept. 7, 1965

3,204,780
OVERHANGING TROLLEY FOR CRANES
Douglas E. Holt, Mequon, Alexander V. Kore, West Allis, and Max Dechantsreiter, Milwaukee, Wis., assignors to Harnischfeger Corporation
Original application July 11, 1963, Ser. No. 294,329, now Patent No. 3,190,456, dated June 22, 1965. Divided and this application Dec. 17, 1964, Ser. No. 418,992
4 Claims. (Cl. 212—15)

The present application is a divisional application of our co-pending United States application Serial No. 294,329, filed July 11, 1963, and entitled "Shipboard Cargo Transferring Apparatus," which issued as United States Patent No. 3,190,456 on June 22, 1965.

This invention relates to shipboard cargo transferring apparatus and more particularly to such an apparatus of a travelling U-type gantry construction which is capable of fore and aft translational movement relative to the vessel and which is provided with a rotatable trolley designed for athwartship port and starboard translational movement so as to load and unload containers at any desired point of the vessel and on either side thereof.

The subject apparatus, in the embodiment thereof illustrated in the accompanying drawings and hereinafter described, comprises a gantry structure in the form of two gantry sills which are equipped with four upwardly extending gantry shear legs between which are mounted two box girders. Side mounted beams are contained on each of the box girders, and inverted racks and trolley rails are provided on the beams for rack and pinion translational driving of a trolley structure athwartship from the port to starboard direction and vice versa. The gantry structures are also provided with four equalizer trucks located at the opposite corners thereof and with an inverted rack and pinion gantry drive assembly located on the port and starboard sides thereof intermediate each pair of equalizer trucks.

The trolley structure comprises a lower translational trolley frame and an upper revolvable trolley frame which is adapted for rotation through a 180° arc with respect to the lower frame. Ring bearing and internal ring gear structure are provided for cooperation with a pinion gear activated by the upper trolley frame to effect the described rotation.

An object of the present invention is to provide an overhanging trolley for a crane and which has an inverted rack and pinion drive arrangement for the translational movement of the trolley relative to the gantry crane whereby breakdowns due to ice collecting in the rack structure and due to contamination of the rack teeth by misplaced metal parts are obviated;

to provide an inverted rack and pinion drive arrangement for translational port to starboard movement of a trolley relative to a gantry crane whereby positive non-skew and non-tilting movement may be achieved, and to provide an inverted rack and pinion drive arrangement for a trolley which moves translationally from port to starboard in a manner which allows translational movement even over irregular and flexed tracks.

These and other objects, advantages, and features of the subject invention will hereinafter appear, and, for purposes of illustration, but not of limitation, an exemplary embodiment of the subject invention is shown in the appended drawings, in which:

FIGURE 1 is a transverse elevational view from aft to fore of a deck of a vessel equipped with a shipboard cargo transferring apparatus constructed in accordance with the subject invention;

FIGURE 2 is an elevational end view of the apparatus of FIGURE 1 from the starboard side of the deck;

FIGURE 3 is a fragmentary top plan view showing a rotatable trolley of the transferring apparatus in stowed fore to aft aligned position;

FIGURE 4 is a top plan view showing the trolley in an operative port side position;

FIGURE 5 is an enlarged fragmentary portion of the lower right hand side of FIGURE 2;

FIGURE 6 is an enlarged fragmentary portion of the lower left hand side of FIGURE 1;

FIGURE 7 is a fragmentary front perspective view of a gantry drive assembly;

FIGURE 8 is a similar rear perspective view of the gantry drive assembly;

FIGURE 9 is a schematic diagram of a trolley drive arrangement;

FIGURE 10 is a view in section showing means for rotating the trolley, and

FIGURE 11 is a view in section of a wedge-locking arrangement for preventing rotation of the revolvable trolley.

*General arrangement*

With reference to the drawings, the numeral 1 generally designates a shipboard cargo container transferring apparatus produced in accordance with the subject invention. The apparatus 1 comprises a travelling U-type gantry crane 2 which is mounted on the deck 4 of a ship for movement relative thereto. The gantry crane 2 is adapted for fore and aft translational movement relative to the deck 4 and a trolley assembly 6 is mounted on the crane 2 for athwartship port to starboard translational movement relative to the deck 4 and for rotational movement to face either the port or starboard sides.

The gantry crane 2 comprises port and starboard gantry sills 8P and 8S respectively. Four shear legs extend perpendicularly upwardly from the respective ends of the gantry sills 8P and 8S. These legs comprise two port side shear legs 10PA and 10PF located aft and fore respectively and two starboard side shear legs 10SA and 10SF located aft and fore respectively. Fore and aft box girders 12F and 12A respectively are mounted between the four shear legs 10PF and 10SF and between the aft shear legs 10PA and 10SA respectively, to complete the basic U-type gantry structure. Each box girder 12F and 12A is provided with a side mounted beam 14F and 14A respectively. The said beams, in conjunction with four stabilizing plates 18PF, 18SF, 18PA, and 18SA, support the trolley assembly 6, in a manner hereinafter described. Gateway structure, generally indicated at 9, is provided on the gantry crane 2 for accessibility to the trolley assembly 6.

*Translatable lower trolley frame*

The trolley assembly 6 comprises a lower trolley frame 20 which is adapted for athwartship port to starboard translational movement and an upper revolvable trolley frame 22 for rotational movement relative to the lower trolley frame 20, as hereinafter described. As best seen in FIGURE 4, the opposite ends of the lower trolley frame 20 are provided with suitably journalled rim-wheels 24, 26, 28 and 34, 36, 38. The beams 14A and 14F of the crane 2 are provided with rails 16A and 16F respectively, and the indicated rim-wheels are positioned on the said rails for rotational and translational movement thereover.

Inverted racks 30A and 30F are mounted on the underside facing interiors of the respective beams 14A and 14F, as best seen in FIGURE 9. Pinion wheels 32A and 32F mesh with the respective racks 30A and 30F. The pinion wheels 32A and 32F are both driven from a drive motor 40 which is suitably mounted on the hollow interior of the lower frame 20, as indicated in FIGURES 2 and 9. The motor 40 drives a shaft assembly 42 which comprises a series of individual shaft lengths suitably interconnected by bearing couplings C. The opposite ends of the shaft assembly 42 drive gear reduction units 46A and 46F, which in turn drive the respective pinion wheels 32A and 32F.

A conventional induced-current brake 44 is located adjacent the drive motor 40 and is adapted to arrest the motion of the shaft assembly 42 upon appropriate energization. The induced-current brake 44 is preferably a direct current electromagnetic member which may be energized to establish a magnetic field, which field gives rise to torque resisting, the induced current for impeding the movement of the shaft assembly 42. In the described embodiment, the brake 44 is adapted for automatic energization by suitable level sensing means (not shown) when the trolley assembly 6 traverses a downhill incline of six or more degrees, whereby gravitational acceleration of the trolley assembly 6 is minimized when the deck 4 exhibits the indicated six or more degrees list. Of course, the brake 44 may also be set for manual excitation.

It should be noted that the centrally disposed wheels 26 and 36 of the lower trolley frame 20 are respectively located in axial alignment with the pinion wheels 32A and 32F so that a positive drive of the trolley assembly 6 relative to the gantry crane 2 may be achieved, notwithstanding irregularities or curvatures inherent in the side beams 14A, 14F and rails 16A, 16F. With the described arrangement, the centrally disposed wheels 26, 36 will always engage the respective rails 16A and 16F as rotation of the pinion wheels 32A and 32F causes athwartship translational movement of the trolley assembly 6. Interior or starboard wheels 28, 38 (relative to the FIGURE 4 disposition) will be retained upon the respective rails 16A, 16F, although the port wheels 24, 34 will extend outwardly beyond the gantry crane 2 in free space. The stabilization plates 18PA, 18PF serve as a safety feature to prevent any tilting of the trolley assembly 6 in the indicated portside disposition.

For starboard side loading or unloading, the trolley assembly 6 is positioned oppositely from its FIGURE 4 disposition, with the starboard wheels 28, 38 being disposed in free space and with the centrally disposed wheels 26, 36 and the port wheels 24, 34 engaging the respective rails 16A, 16F. In this starboard disposition, the stabilization plates 18SA and 18SF perform the analagous antitilting function. As a further safety feature, limit switches (not shown) are provided in the path of movement of the wheels 26, 36 to prevent travel of the trolley assembly 6 beyond the indicated extreme portside and starboard side dispositions. In this manner, it is possible to extend the load handling structure of the trolley assembly, as hereinafter described, beyond either side of the vessel without utilizing cumbersome and unwieldy arrangements such as extensible or telescoping trolley booms or dual trolley arrangements.

The combination of the pinion wheels 32A, 32F intermeshing with the inverted racks 30A, 30F and of the rim wheels 24, 26, 28 and 34, 36, 38 riding upon the respective rails 16A, 16F in the described two-on one-off stabilized arrangement provides a unique and simple positive drive sequence for translational movement of the trolley assembly 6, even when the vessel is listing. Complex and space-consuming winch and cable arrangements are thereby eliminated, and a simple rack and pinion drive is provided for non-skew and non-tilting positive engagement. Also, the provision of the inverted racks 30A, 30F allows for self-draining of the rack structure so that deleterious ice formations are obviated. Likewise, the inverted rack is not subject to the problem of contamination of the rack teeth by small misplaced items, such as tools, bolts, and the like.

Rotatable upper trolley frame

Means for rotating the upper revolvable trolley frame 22 relative to the lower trolley frame 20 are schematically illustrated in dash lines in FIGURE 3 and are shown in detail in FIGURE 10. An upper bearing block 48 is affixed to the upper trolley frame 22 by bolts 52a, 52b. Similarly, a lower bearing block 54 is affixed to the frame 22, via an interconnecting L-plate 58, by means of a bolt assembly 60. The bearing blocks 48 and 54 are provided with the bearing assemblies 50 and 56 respectively, and a shaft 62 is journalled for rotation therein.

A pinion wheel 64 is affixed to the shaft 62 for rotation therewith, and a motor and reduction drive means 66 is provided for rotation of the shaft 62 and therefore of the pinion wheel 64. A circular ring gear 68 is mounted on the lower frame 20 by a bolt assembly 72, and the ring gear 68 is provided with internal circumferentially spaced teeth 70 which are adapted to mesh with teeth 65 of the pinion wheel 64.

An internal ball-bearing race 74 is mounted on a flange of the ring gear 68 by the same bolt assembly 72 which mounts the ring gear 68 to the lower frame 20. An external ball-bearing race 76 is affixed to the upper frame 22 by a bolt assembly 80, and a ball bearing assembly 78 is sandwiched between the races 74 and 76 in a conventional manner.

In this manner, appropriate energization of the motor and reduction drive means 66 will cause a corresponding rotation of the pinion wheel 64 and, via the intermeshing of the pinion wheel 64 and the ring gear 68, rotation of the revolvable upper trolley frame 22 relative to the stationary lower trolley frame 20. Limit switches (not shown) are provided so that the trolley assembly 6 may be rotated 90° to port or to starboard from the stowed position shown in FIGURE 3.

Wedge lock assembly

Locking means are provided for preventing rotation of the revolvable upper trolley frame 22 relative to the lower trolley frame 20, when desired. These means comprise four wedge lock assemblies 82a–d which are schematically illustrated in FIGURE 3 and one of which 82a, is shown in detail in FIGURE 11. The assembly 82a comprises a guide housing 84 which is mounted in a bearing socket 86 of the upper revolvable trolley frame 22 and in a bearing socket 88 of a frame portion 90 of the trolley frame 22. A torsion tube 92 is positioned within the housing 84 and is adapted for rotation therein. An upper bearing 94 and a lower bearing 96 centrally position the torsion tube 92 within the housing 84.

An eccentric member 98 is affixed adjacent the lower end 100 of the torsion tube 92, and the said lower end 100 is received in a bearing socket 102 of the lower trolley frame 20. A wedge-shaped block 104 is provided with an opening 103 which may receive the eccentric member 98 therein, such that rotation of the member 98 induces rotation of the block 104. As shown in FIGURE 11, the wedge-block 104 is sandwiched within a space 105 between the frames 20 and 22.

The upper bearing 94 is provided with a pin slot 106 which is adapted to align with apertures 107, 108 of the housing 84 so that a cotter pin (not shown) may be received through the apertures 107, 108 and the slot 106 in order to fix the rotational position of the torsion tube 92. A head member 110 is affixed to the uppermost extreme of the torsion tube 92, and a yoke member 112 is affixed to the head member 110 by a link 113. In the case of the assembly 82a, a handle element 116 is pivoted to the yoke 112, as indicated at 114, so that the torsion tube 92 may be axially or rotationally displaced by appropriate manipulation of the handle element 116. The handle element extends into an operator's cab, hereinafter described, so that the upper frame may be locked in either the operative port or starboard dispositions by appropriate rotation of the block 104 between the frames 20 and 22, as hereinafter described.

*Gantry drive means*

The gantry drive means comprises a centrally disposed gantry drive assembly which is located beneath each gantry sill and equalizer trucks located beneath each shear leg of the gantry crane. For convenience, only the starboard side gantry drive means are illustrated and described herein, although the portside gantry drive means is symmetrically identical. The illustrated means comprises a gantry drive assembly 13S centrally disposed beneath the gantry sill 8S and two equalizer trucks 11SA and 11SF located beneath the gantry shear legs 10SA and 10SF respectively.

As best seen in FIGURE 5, the equalizer truck 11SF comprises a housing 29SF which is provided with two rim-wheels W suitably journalled for rotation therein. As best shown in FIGURE 6, the rim-wheels W ride upon a channel beam affixed to the deck floor of the vessel, as for example the channel beam 31P illustrated in FIGURE 6.

The gantry drive assembly 13S, as illustrated in FIGURES 7 and 8, comprises a U-shaped support mounting 23S, upon which is suitably placed a drive motor 15S, an electric brake 17S, a worm reducer assembly 19S, and a spur reduction assembly 21S. The drive assembly 13S operates a pinion wheel 25S, which is adapted to intermesh with a stationary inverted rack 27S affixed to the deck 4 of the vessel. The provision of a pinion wheel intermeshing with an inverted rack and the topside disposition of the wheels W provides a positive anti-skew drive for the gantry crane 2 in a fore and aft translational direction. It should also be noted that the inverted rack 27S achieves the same desirable results as previously described for the inverted racks 30F and 30A for the port to starboard translational movement of the trolley assembly 6.

*Upper trolley frame structure*

The upper trolley frame structure comprises an enclosed machinery housing 33 which is suitably mounted on the upper revolvable trolley frame 22. The housing 33, which is provided with an access door 35 (see FIGURE 1), encloses various machinery and electrical equipment contained in the trolley assembly 6. This arrangement provides weather and corrosion resistance, especially under heavy sea duty. Gateway structure, indicated by 37, is also provided on the housing 33.

A superstructure 43 extends from the housing 33, and an operator's cab 39 is disposed beneath the superstructure 43, as shown in FIGURE 1. In the described embodiment, the operator's cab 39 is an all glass-enclosed cockpit which enables an operator to control the apparatus 1 from a unique centrally disposed location overlooking the raising and lowering of a load (not shown).

*Operation*

In use, the shipboard cargo container transferring apparatus 1 is normally stowed in the longitudinal fore to aft disposition shown in FIGURE 3. The torsion tubes of each wedge-lock assembly 82a–d are in a lowered block-engaging position and the blocks of each assembly are interposed between the frames 20 and 22 such that rotation of the upper trolley frame 22 relative to the lower trolley frame 20 is impeded. As indicated in FIGURE 11, a cotter pin (not shown) may be received within the pin slot 106 and the apertures 107, 108 in order to maintain the stowed non-operative position. With this arrangement, as much as forty percent of the load of the upper trolley frame 22 can be supported by the interposed wedge-blocks so that undue wear and brinnelling of the rotation bearings are avoided, even when the transferring apparatus 1 is jostled about in heavy seas. Also, suitable pin means (not shown) may be provided for locking the trolley assembly 6 relative to the gantry crane 2 and for locking the gantry crane 2 relative to the deck 4 of the vessel.

When the vessel is docked and it is desired to load or unload cargo, an operator enters the housing 33 via the access door 35 and removes each of the cotter pins from the wedge-lock assemblies 82a–d. The operator then manually rotates each of the wedge-lock assemblies such that the wedge-blocks thereof are removed from locking interposition between the frames 20 and 22. The torsion tube of each wedge-lock assembly is then manually elevated, and the cotter pin thereof is reinserted through the pin slot 106 so as to overlie the upped edge of the tubular guide housing 84. In this position, the upper trolley frame 22 is free to rotate relative to the lower trolley frame 20, as desired.

The operator then enters the cab 39 and energizes the motor and reduction means 66 in order to rotate the trolley assembly 6 through a 90° arc in either direction, as for example to a portside disposition as shown in FIGURE 1. After the described rotation has been effected, the operator grasps the handle element 116, which extends into the cab 39, and lowers the torsion tube 92 of the wedge-lock assembly 82a in order to engage the eccentric member 98 with the wedge-block 104 and then rotates the wedge block 104 into locking engagement between the frames 20 and 22. Only one wedge-lock assembly (i.e., the wedge-lock assembly 82a) is utilized in this phase of the operation, since the locking of one such assembly will effectively secure the trolley assembly 6 in the desired orientation.

The operator then energizes the gantry drive means (such as the gantry drive assembly 13S) so as to translate the gantry crane 2 to a desired fore and aft disposition overlooking a cargo hold. The operator then energizes the drive motor 40 of the trolley assembly 6 in order to position the trolley assembly 6 over a given load to be removed.

The trolley assembly 6 is thus moved in the port or starboard directions. In case the vessel is listing, the brake 44 of the trolley assembly 6 automatically decelerates the driven movement of the trolley assembly 6 on any downward incline which exceeds the predetermined six or more degrees of list.

When a position overlying a given load is achieved, the operator can raise or lower the load by appropriate grappling means and motors (not shown).

When loading or unloading operations are completed, the trolley assembly 6 is returned to its stowed longitudinally aligned position shown in FIGURE 3, and the wedge-lock assemblies 82a–d are reactivated by reversing the unlocking procedure originally described. In the foregoing manner, it is possible to load or unload a vessel equipped with the transferring apparatus 1 in an absolute minimum of time from the stowed to operative to stowed positions of the trolley assembly 6. Also, it is possible to load or unload the vessel from either side thereof and, if required, to load or unload a given vessel on both sides thereof (as for example, portions of the cargo being placed on a port side dock and other portions of the cargo being placed on a starboard side dock). Throughout the entire operation, only one individual is required for operation of the apparatus 1, and his location in the cab 39 affords maximum viewability for loads being carried, raised, or lowered from the superstructure 43 of the trolley assembly 6.

While the foregoing description relates to a specifically disclosed embodiment of the invention, it is should be understood that various changes, alterations, and modifications may be effected in the details of construction and arrangements of the various elements without departing from the spirit and scope of the instant invention, as defined in the appended claims.

Various modes of carrying out the invention are contemplated as being within the scope of the following claims particularly pointing out and distinctly claiming the subject matter which is regarded as the invention.

We claim:

1. Shipboard cargo transferring apparatus of the character described adapted to move in fore and aft and in port and starboard directions on the deck of a vessel in order to transfer a cargo load and which comprises:
   a U-type gantry crane having parallely aligned cross girders;
   rail means on each girder;
   an inverted rack on each girder in parallel alignment with the rails means thereof;
   a trolley assembly adapted for translational movement relative to and for extension beyond either end thereof the girders;
   two sets of three wheels each, each set of three wheels being journalled on the trolley assembly and located on either side of said trolley assembly and mounted in engagement with the corresponding rail means; the outer wheel of each set extending beyond said girders when said assembly extends byeond the corresponding end, means for preventing tilt of said assembly when in said extended overhanging position; and
   pinion drive means on either end of the trolley assembly and intermeshing with the corresponding inverted rack.

2. Shipboard cargo transferring apparatus of the character described adapted to move in fore and aft and in port and starboard directions on the deck of a vessel in order to transfer a cargo load and which comprises:
   two parallely aligned gantry sills;
   means for mounting the gantry sills on the deck for translational movement relative thereto;
   two shear legs extending upwardly from the opposite ends of each sill;
   two parallely aligned cross girders each interconnecting a shear leg of one sill with the oppositely disposed shear leg of the other sill;
   a rail carried by each girder;
   an inverted rack carried by each girder in parallel alignment with the rail thereof;
   a trolley frame;
   two sets of three drive wheels each, each set of three drive wheels being journalled for rotation in the trolley frame in diametrically co-linear alignment and located on either side of the trolley frame for engagement with the corresponding rail; said trolley frame and one wheel of each set being adapted to extend beyond either end of said girders;
   a pinion wheel on either side of the trolley frame in axial alignment with the centrally disposed drive wheel thereof and intermeshing with the corresponding inverted rack; and
   means for synchronously rotating the pinion wheels in order to move the trolley frame relative to the girders.

3. Apparatus as claimed in claim 2 and further comprising four anti-tilt stabilization plates, each located at an end of a girder in parallel alignment with the rail thereof such that the corresponding drive wheels of the trolley frame may pass between the corresponding rail and its associated stabilization plate at each of the ends of the girders.

4. A crane comprising;
   two parallel cross girders; rail means on each girder, an inverted rack on each girder in parallel alignment with the rail means thereof; a trolley assembly adapted for translation movement relative to and for overhanging extension beyond either end of the girders; two sets of three wheels each, each set of three wheels being journalled on the trolley assembly and mounted in engagement with the corresponding rail means, the outer wheel of each set extending beyond said girders when said assembly extends beyond the corresponding end, means for preventing tilt of said assembly when in said extended overhanging position, and pinion drive means on either side of the trolley assembly and intermeshing with the corresponding inverted rack.

References Cited by the Examiner

UNITED STATES PATENTS

| 2,424,899 | 7/47 | Priester | 212—15 |
| 2,499,442 | 3/50 | Wright | 212—74 |
| 2,700,345 | 1/55 | Cox | 105—29 |
| 2,971,475 | 2/61 | Weber | 105—29 |
| 3,033,152 | 5/62 | LeTourneau | 105—29 |
| 3,061,112 | 10/62 | Bevard | 212—74 |

FOREIGN PATENTS 997,682  10/49  France.

SAMUEL F. COLEMAN, *Primary Examiner.*